United States Patent [19]

Abdelmalek

[11] Patent Number: 5,136,854
[45] Date of Patent: Aug. 11, 1992

[54] CENTRIFUGAL GAS COMPRESSOR - EXPANDER FOR REFRIGERATION

[76] Inventor: Fawzy T. Abdelmalek, 12807 Willowyck Dr., St. Louis, Mo. 63146

[21] Appl. No.: 706,328

[22] Filed: May 28, 1991

Related U.S. Application Data

[63] Continuation-in-part of Ser. No. 645,804, Jan. 25, 1991.

[51] Int. Cl.[5] ............................................. F25B 1/00
[52] U.S. Cl. ................................. 62/116; 62/238.4; 62/501; 60/651
[58] Field of Search ..................... 62/238.4, 501, 116; 60/651

[56] References Cited

U.S. PATENT DOCUMENTS 3,861,466 1/1975 Goldsberry ........................ 62/116 X
4,055,964 11/1977 Swenson et al. ....................... 62/501

Primary Examiner—William E. Wayner
Attorney, Agent, or Firm—Peoples, Hales, Coleman

[57] ABSTRACT

Centrifugal gas compressor - expander for use in refrigeration system where low temperature level energy rejected from the condenser is recovered and used to produce kinetic energy to assist driving the compressor, and thus reducing the electric power required for refrigeration.

7 Claims, 3 Drawing Sheets

CENTRIFUGAL GAS COMPRESSOR - EXPANDER FOR REFRIGERATION

BACKGROUND OF THE INVENTION

1. Field of the Invention

The present invention relates generally to refrigeration systems and more particularly to centrifugal compressor-expander unit to provide compression of low pressure vapor refrigerant for cooling cycle and expansion of high pressure vapor refrigerant for thermal power cycle. The unit has an electric drive motor with overhung shaft on both sides, a centrifugal compressor assembly is directly coupled and supported on one end of the drive shaft, and a centrifugal expander assembly is directly coupled and supported on the other end of the shaft. The main assembly of the motor, compressor and expander are contained in hermetically sealed enclosure or of semi-hermetic sealed compressor and expander assembly. In the present invention the expander provides part of the work required to drive the compressor, therefore, substantially improves the efficiency of the refrigeration cycle through reduction of the net work input into the system.

2. Description of the Prior Art

Vapor compression direct expansion refrigeration cycle is well known in the field of refrigeration/heat-pump systems. In theoretical vapor compression refrigeration cycle, saturated vapor refrigerant at low pressure enters a compressor and undergoes isentropic compression. The high pressure vapor enters a condenser, where heat is rejected from the fluid at constant pressure, the working fluid leaves the condenser as saturated liquid, an adiabatic expansion process follows across a direct expansion valve or capillary tube. The working fluid is then absorbs heat and evaporates at constant pressure before entering the compressor.

In the past, the design of direct expansion refrigeration units has not generally taken advantage of the low temperature level energy rejected from the condenser. Generally only liquid expanders were employed to take advantage of energy lost in the execution of expansion through throttling of the liquid refrigerant. For example a refrigerant expander compressor system of this type was enclosed in U.S. Pat. No. 3,934,424, another example is an integral turbo compressor—expander system for refrigeration was used to permit power recovery by the compressor from the expansion of the liquid refrigerant is enclosed in U.S. Pat. No. 3,494,145.

Generally, however, systems as described above which utilize or attempt to utilize the work used in throttling or expansion process of liquid refrigerant fluids have not found wide acceptance. Accordingly, the equipment necessary for its recovery has not been thought to be economically feasible because very little work has been recovered and very small improvement of performance and efficiency of the basic vapor compression refrigeration cycle has been achieved.

SUMMARY OF THE INVENTION

The present invention provides Hermetically or Semi-hermetically enclosed electric driven centrifugal gas compressor assisted with a centrifugal gas expander. On the compressor side, low pressure vapor from the refrigeration evaporator enters the intake chamber of the compressor and is compressed into the superheat region, and discharged at high pressure level to one side of a shell and tube or plate type heat exchanger, where the superheated gas exchanges its heat and condenses to saturated liquid, consequently on the other side of the heat exchanger, a high pressure refrigerant of the expander system is heated and the evaporated gas enters the expander to undergo isentropic expansion and drives its rotor. In the present invention the refrigeration cycle and the power cycle are thermally coupled through exchanging their thermal energy in a heat exchanger and are mechanically, and electrically coupled by a common drive shaft and the electric motor.

It is therefore a principle object of the present invention to conserve energy by utilizing heat rejected from the air conditioning or refrigeration system to produce Kinetic energy and drive the compressor.

It is further an object of the present invention to provide a centrifugal gas compressor-expander unit incooperating electric drive motor with common drive shaft for use in large refrigeration systems.

It is further an object of the present invention to provide such a compression-expansion apparatus for refrigeration systems which is in expensive to the maintain and to operate.

It is further an object of the present invention to reduce the electric power required for driving refrigeration systems.

It is further an object of the present invention to achieve high efficiency of refrigeration system.

The present invention fulfills the long felt need to reduce and conserve electric power required to drive large cooling and refrigeration systems. The above and other objects and advantages of the present invention will become apparent from the following specifications, drawings and claims. It will be understood that the particular embodiments of the invention are shown by way of illustration only and not as limitation of the invention. The principle features of this invention may be employed in various embodiments without departing from the scope of the invention.

DETAILED DESCRIPTION OF THE PRESENT INVENTION

Figure 1:
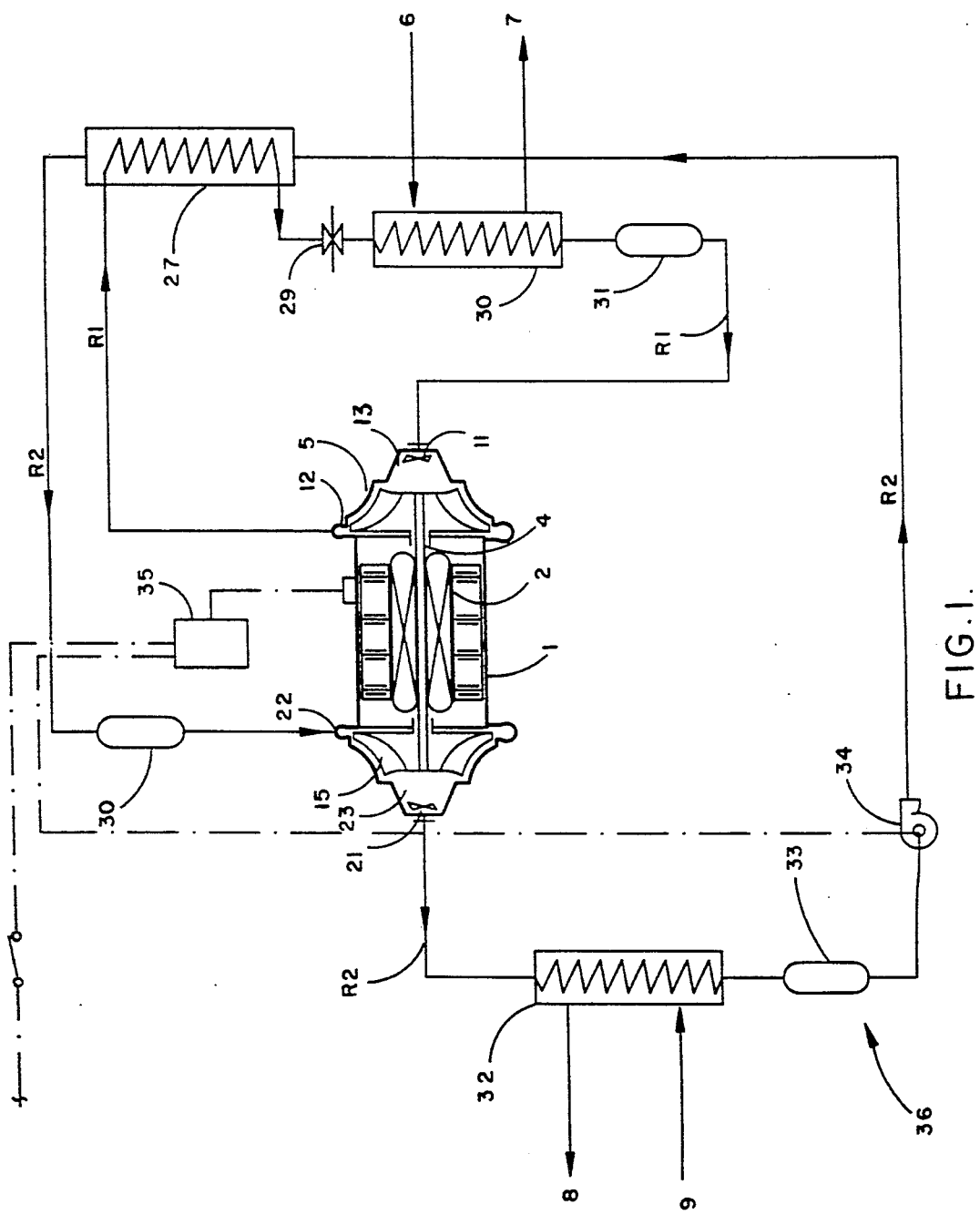
FIG. 1 is a schematic diagram for refrigeration system employing a centrifugal gas compressor-expander unit.

In a gas compression direct expansion refrigeration cycle, the high pressure liquid refrigerant expands adiabatically in an expansion valve or in a capillary tube before entering the evaporator coil, the heat of the building or alike, is removed, and the liquid refrigerant is evaporated, the hot gas is then compressed by a gas compressor to high pressure and temperature levels, then enters the condenser where the heat load and the heat of compression is rejected to atmosphere at constant pressure, the hot gas is cooled and is condensed at ambient conditions.

In the present invention, cooling and condensing of the hot gas refrigerant is completed by thermal exchange of its heat energy with another refrigerant fluid which is used to drive a thermal power gas expander. The high pressure liquid refrigerant of the power expander circuit enters in a heat exchange relationship with the high pressure hot gas of the refrigeration circuit. While the high pressure hot gas refrigerant in the refrigeration circuit is cooled and condensed, the high pressure liquid refrigerant of the expander circuit is heated and evaporated. Depending on the type of refrigerant used, the hot refrigerant gas at high pressure, preferably in the range from 60 to 300 psia, expands isentropically through the gas expander to a lower pressure preferably in the range from 10 to 80 psia, its temperature drops approaching the ambient temperature. The saturated vapor is then cooled at ambient conditions by air or water to change its state to liquid. The liquid refrigerant is then pumped back to the high pressure side of the power expander cycle.

The thermal energy of the working fluid of the power cycle is removed in the form of "work" (1) partly provides kinetic energy needed to drive the compressor of the refrigeration cycle and (2) provides the cooling effect needed to condense the refrigerant of the air conditioning refrigeration system.

For purposes of the present invention, low vapor condensation at the expander exhaust is preferred depending upon the type of working fluid refrigerant used and the operating pressures and temperatures, the expander may operate at the same pressure and temperature levels used for the gas compressor, some deviation is expected depending on the system design and working conditions. The centrifugal expander in this invention is to produce work to assist driving the centrifugal compressor, the working refrigerant of the expander circuit can be of the same type used for the compressor circuit. Depending on the condensing temperature the power produced by the expander will vary between 20 to 70 percent of the power required by the cmopressor, the remaining power needed shall be provided by the electric motor drive.

Centrifugal compressors are well known and probably the most rapidly developing type for larger installations for refrigeration systems. Because of the need of single compressor units, reasons of cost, operating economy, wide range of operating pressures, together with the recent development of smaller sizes and better flow controls to match refrigeration load requirements, all of which made the centrifugal units available for applications for wide range of systems with capacity from 60 to 2,000 tons of refrigeration. The gas centrifugal compressor may be of single or multiple stages, with vertical or horizontal split casing, flow may be of radial, axial or combination of the two. The design and operating parameters of centrifugal compressors are well developed and understood, and the technology presents no particular manufacturing problems. However, competition, high energy costs, and increased federal regulations are compelling manufacturers to develop more efficient systems.

Centrifugal gas compressors will operate in reverse as expanders and can be used to produce power. Expander in this invention is used to produce work to drive the compressor of the refrigeration or air conditioning system.

A number of refrigerants, including for example freon R-11, R-12, R-500, R-22 and refrigerant 717 (ammonia) may be employed in the present invention. The new Clean Air Act has regulated production and use of all types of refrigerants which contain chlorofluorocarbon (CFC), including R-11, R-12, R-500 and the hydrogenated chlorofluorocarbon (HCFC) chemicals which include R-22. Although, the production of these refrigerants shall be banned by year 2000 new refrigerant products have been developed. Provided such new products prove to be safe, nonflammable, nontoxic and meet the new Clean Air Act limit requirements for the ozone Depletion Potential (ODP), the Greenhouse Warming potential (GWP), and the Allowable Exposure Level (AEL), they may be employed in the present invention.

Refrigerant HCFC 123, developed for low pressure refrigeration systems replaces R-11, and refrigerant HCFC-134a for medium pressure refrigeration systems, replaces R-12. These new products have been certified by the Air Conditioning and Refrigeration Institute and by the Environmental Protection Agency.

OPERATION

In FIG. 1 the invented system 36 has a thermally coupled compression refrigeration system and expansion power system, it includes an electric driven compressor-expander 1, the compressor 5 has discharge 12 and suction 13 connected to the refrigeration closed circuit, in which the high pressure hot gas enters heat exchanger 27 and undergoes a thermal heat exchange relationship with the high pressure liquid refrigerant R2, the hot gas of refrigerant R1 is cooled and condensed, and the cold liquid of refrigerant R2 is heated and evaporated. The liquid refrigerant R1 undergoes an adiabatic expansion process through an expansion valve 29 to evaporator 30, where the expanded low pressure liquid refrigerant is evaporated while the cooling fluid return 6 from building or alike is chilled and cooling fluid supply 7 is pumped back to building. The low pressure saturated vapor of refrigerant R1 then enters gas accumulator 31 before entering the compressor intake 13, where it is compressed to the high pressure level and the refrigeration cycle is completed.

On the other side, the expander 15 has intake 22 and discharge 23 connected to the power generation closed circuit, the evaporated high pressure gas refrigerant R2 is released from heat exchanger 27 to the expander intake 22, the gas expands isentropically through the expander, and kinetic energy is removed causing the common shaft to rotate and to drive the compressor rotor. The low pressure gas of refrigerant R2 exits the expander discharge 23 to enter condenser 32 where the saturated vapor is condensed to liquid by removing its latent heat by cooling tower water or alike, where cold water supply 8 is heated and hot water return 9 is returned to the cooling tower. The liquid refrigerant R2 enters liquid receiver 33, then pumped to high pressure side of the power cycle by a liquid pump 34, back to heat exchanger 27 and the power cycle is completed. The power generated by the expander 15 is used to directly drive the common shaft which drives the rotor of the compressor 5. The electric motor 2 provides the difference of power required by the compressor 5 and that produced by the expander 15. A control panel 35 provides control for the system operation to run and stop by temperature controls, and to control the refrigerant flow rate at start-up of the system by operating control valves 11 and 21 to prevent overload surge conditions.

Figure 2:
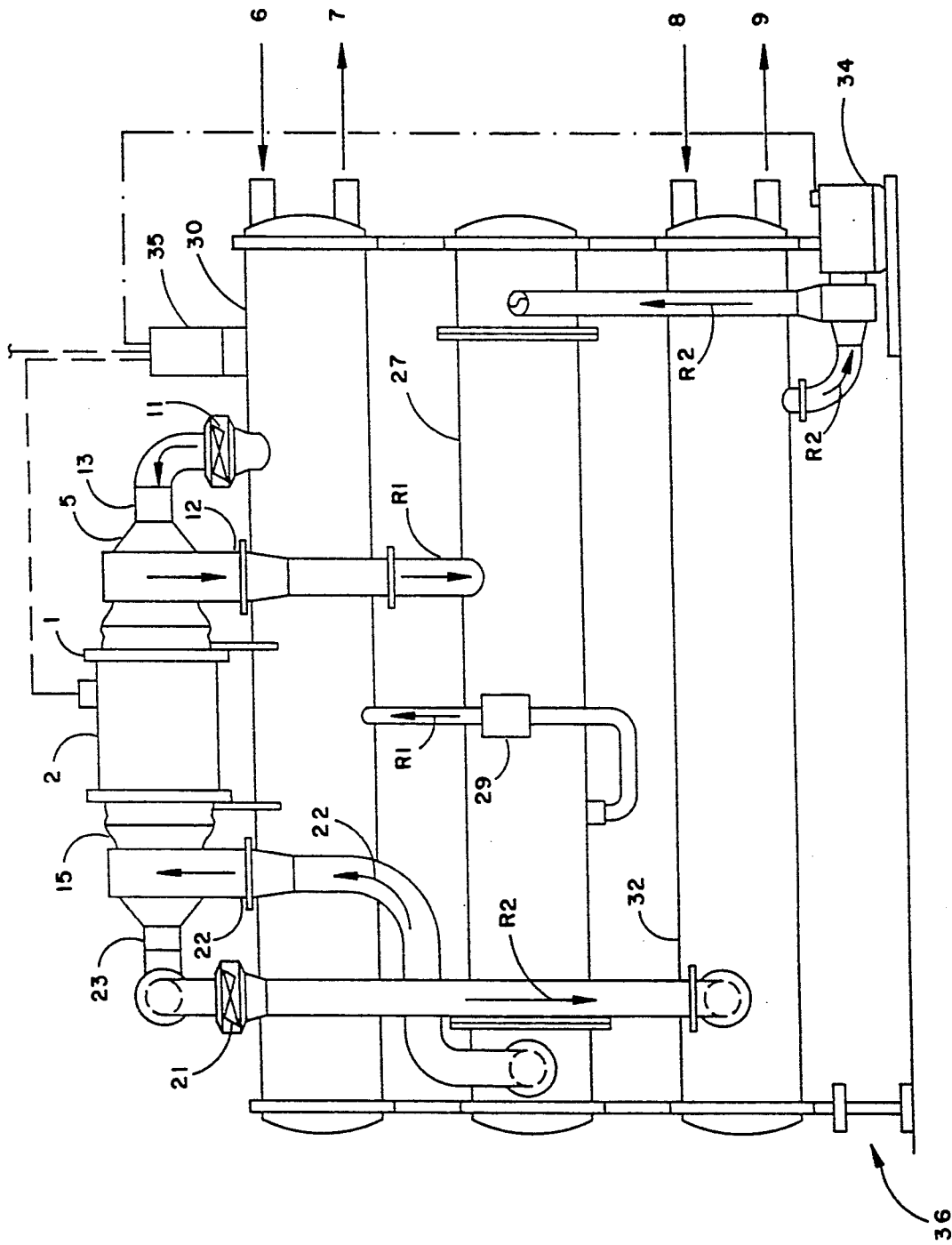
FIG. 2 is a schematic view showing centrifugal gas compressor—expander unit used with a liquid chiller.

FIG. 2 indicates a schematic view of hermetically sealed electric driven centrifugal compressor-expander unit 1 used with a liquid chiller for the present invented system 36. The invented hermetically sealed compressor-expander assembly 1 consists of hermetically sealed enclosure contains an electric motor assembly 2, having common drive shaft with support bearings and thrust rings, a centrifugal compressor assembly 5, and centrifugal expander assembly 15. The compressor main assembly 5 consists of rotor assembly contained inside a sealed enclosure assembly having low pressure intake 13 flow guide control vane valve 11, and high pressure discharge 12. Similarly, the expander main assembly 15 consists of a rotor assembly contained inside the said sealed enclosure assembly having high pressure intake 22, flow guide control vane valve 21, and low pressure discharge 23. The refrigeration evaporator 30 of the liquid chiller is a shell and tube or plate type heat exchanger connected on one side to the cooling fluid circuit 6–7, of a building or alike, and on the other side to the compression closed circuit. Condenser 27 of the refrigeration system is the vapor generator for the power system which is a shell and tube or plate type heat exchanger, connected on one side to the compression refrigeration closed circuit, and on the other side to the power generation closed circuit, providing the means for the thermal coupling between the refrigeration and the power generation systems. Condenser 32 of the power generation system is a shell and tube or plate type heat exchanger, connected on one side to the power generation circuit, and on the other side to the cooling water tower circuit 8–9, providing the heat rejection means for the combined refrigeration power cycles. Compressor intake flow control vane valve 11, and expander discharge flow control vane valve 21 are electrically interlocked with control panel 35 to provide flow and pressure control of the refrigerant fluids to correspond to changes in the condensing temperature to prevent surge, and to provide heat balance of the two systems. Expansion control valve 29 provides the means for the adiabatic expansion of the high pressure liquid refrigerant R1 before entering the evaporator 30. Pump 34 pressurizes liquid refrigerant R2 from the low pressure level of condenser 32 to the high pressure level of heat exchanger 27.

For purposes of simplicity, the drawings do not indicate the prior art means for motor cooling, forced oil lubricating system, refrigerant filters, and controls for refrigerant flow, pressure, temperature and other electric and electronic specialties. The compressor and expander may be of single or multiple stages, its rotors maybe driven by gear train or mounted and connected directly on the drive shaft.

The expander compartment is separated from the motor compressor compartment with a sealed bulkhead assembly to provide support means and to prevent cross contamination between the compressor and expander low pressure refrigerant streams. The hermetically sealed enclosure assembly is provided with mounting supports having vibration isolation means.

Figure 3:
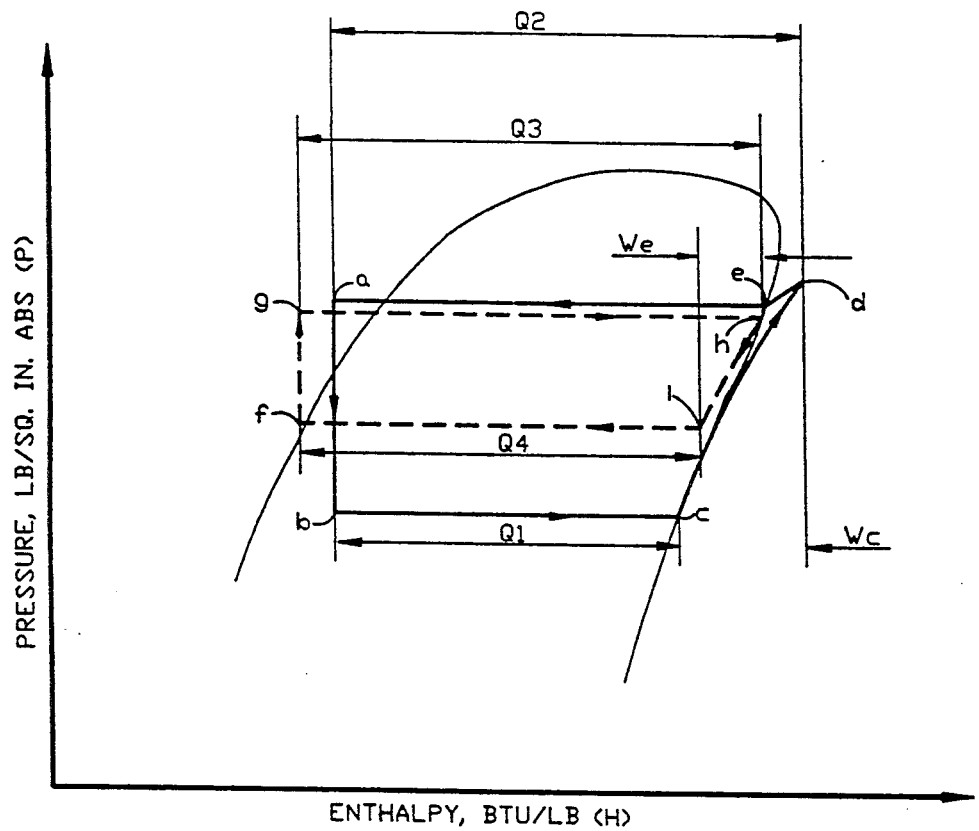
FIG. 3 is a graphical illustration of a thermally coupled vapor compression refrigeration cycle and vapor expansion power cycle on the enthalpy-pressure diagram.

FIG. 3 illustrates the thermodynamics of the compression refrigeration cycle, and the expansion power cycle, expressed on pressure-enthalpy co-ordinates. Although it is appreciated that idealized refrigeration cycle and the idealized expansion power cycle are not possible of attainment, it establishes a criterion of performance from which the merits of the present invention can be measured. In the refrigeration cycle, a liquid refrigerant at point (a) undergoes an adiabatic change to liquid-vapor mixture by expanding along path (ab), Heat is isothermally added to the refrigerant during evaporation along path (bc), during which useful refrigeration or cooling is obtained. The point (c) assume a dry vapor, the vapor is compressed isentropically along path (cd) to high enough pressure to permit heat rejection in the condenser along path (dea). Initially, vapor superheat along path (de) is rejected after which the heat of vaporization is rejected along (ea). Ideally, the heat added to the system at the evaporator $Q1 = Hc - Hd$ by the work input by the compression $Wc = Hd - Hc$, and the heat rejected in the condenser $Q2 = Hd - Ha$ or the net work done by compression is equal to the difference between the heat rejected and heat added or $Wc = (Q2 - Q1)$. In the expansion power cycle a low pressure liquid refrigerant at point (f) is adiabatically pumped to a higher pressure level to reach point (g). The liquid refrigerant exchanges heat with the refrigerant of the compression cycle where heat is added at constant pressure along path (gh). Ideally, the heat added to the expander cycle $Q3 = Hh - Hg$ should be equal to the heat Q2 rejected from the refrigeration cycle. The point (h) assumed dry vapor, the vapor is expanded isentropically along path (hi), to a lower pressure but still permit heat rejection in the condenser along path (if). The heat rejected $Q4 = Hi - Hf$. The work output by expansion $We = (Q3 - Q4)$. Ideally the sum of heat and work input must equal to the heat and work output or $(Q1 + Wc) = (Q4 + We)$ in a conventional refrigeration system the coefficient of performance (COP) for the system is known to be the rate of the refrigeration effect to the work required to produce it, or $COP = Q1/Wc$. For the idealized refrigeration system $Q1/Wc$ can be written as $Q1/(Q2 - Q1)$. In the present invention the work required for the refrigeration shall be decreased by the work produced by the expander, the improved COP of the system $COP = Q1/(Wc - We)$ or $COP = Q1/(Q2 - Q1) - (Q3 - Q4)$.

Now of course, a higher condensing temperatures the expander cycle will have lower efficiency, but its ability to recover the work will increase rapidly as the condensing temperature drops. In the present invention, as in the prior art systems, the refrigeration effect increases when the condensing temperature decreases. In addition, the present invention offers increased power savings at lower condensing temperatures.

Figure 4:
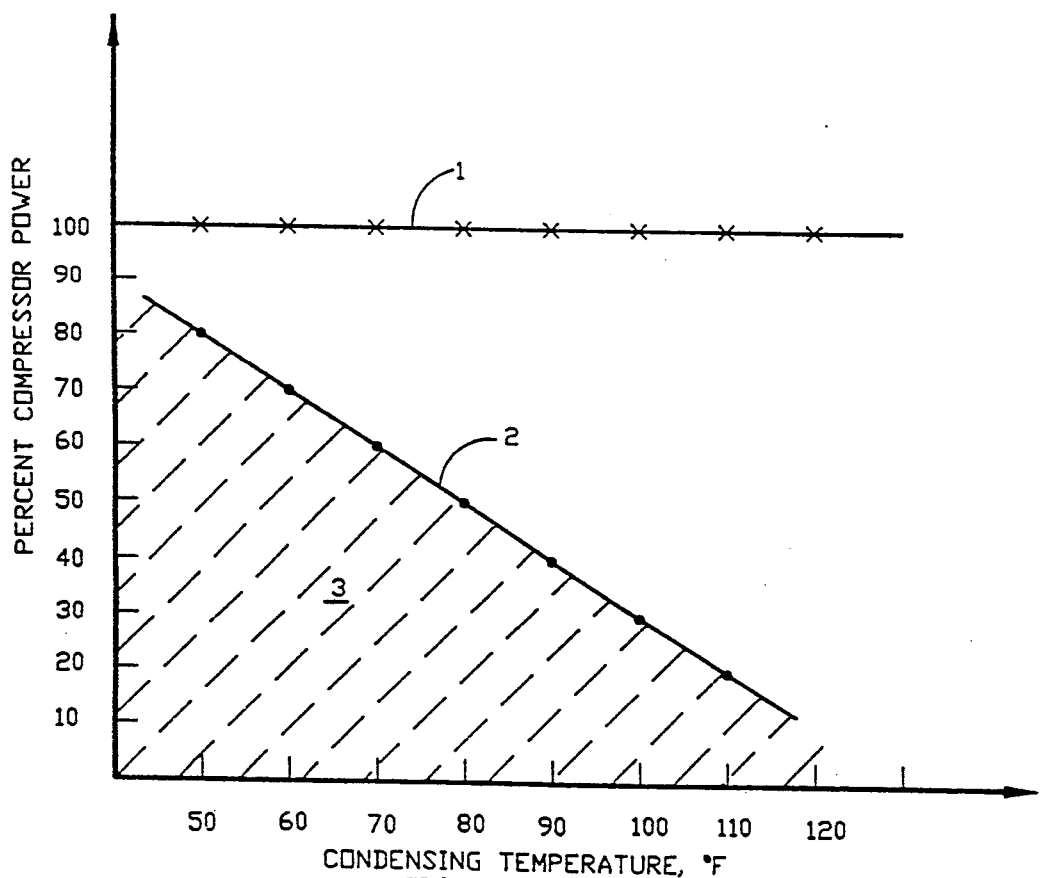
FIG. 4 is a graphical illustration of the energy savings of the present invention.

FIG. 4 indicates a graphical illustration of the energy savings of the present invention. For simplicity purposes it is assumed that the power required by the compressor will not change with the change in the condensing temperature. This relationship is represented by line 1. On the other hand, the power produced by the expander will increase in a linear relationship with the drop in the condensing temperature. For example, when the condensing temperature is 105 degree F, the expander will produce 25 percent of the power required by the compressor, and when the condensing temperature drops to 60 degrees F, the expander power will represent 70 percent of the power required by the compressor. It became obvious that the power savings of the invented system will vary with the condensing temperature as presented by the hatched area 3, and the year around average use of power for refrigeration may range between 50 and 60 percent of that required by the prior art systems.

In conclusion, viewed from the energy conservation standpoint, employing an expander utilizing the energy of heat rejected in the atmosphere is a viable means tremendously improving the cycle efficiency as represented by an improved coefficient of performance.

Since the useful work developed by the present system is so much greater than that delivered by prior art systems, the present system is believed to be economical in the sense that energy savings exceed amortized capital costs in a relatively short period of time. The expander could by actually manufactured from modified commercially produced compressors.

EXAMPLE

The following example indicates comparison data and performance of the invented system when compared with conventional compression-direct expansion refrigeration system. All data are based on 12,000 BTU/hour (one ton cooling) and represents certain particulars which may vary.

| I. REFRIGERATION SYSTEM | | |
|---|---|---|
| a. Refrigerant (R-12) Flow rate lb/min | 3.3 | |
| b. Cooling capacity BTU/hr. (tons) | 12,000 | (1.0) |
| c. Power requirement BTU/hr. (kw/hr) | 2550 | (.75) |
| d. Coefficient of performance (COP) | 4.7 | |
| II. EXPANDER SYSTEM | | |
| a. Refrigerant (R-12) flow rate lb/min | 3.3 | |
| b. Energy reclaimed from refrigeration condenser BTU/hour | 14,400 | |
| c. power produced by expander BTU/hr. (kw) | 1385 | (.40) |
| d. Energy used for high pressure refrigerant liquid pump BTU/hour (kw/hour) | 255 | (.075) |
| III. COMBINED SYSTEM | | |
| a. Net power generated by the system | 1130 | (.330) |
| b. Net power required for cooling | 1420 | (.420) |
| c. Coefficient of performance (COP) | 8.4 | |

The above indicates an estimated 44 percent savings of the power used for cooling, and indicates that the power needed to drive the liquid pump is less than 20 percent of the power produced by the gas expander.

What is claimed is:

1. In combination with a direct expansion refrigeration/heat pump system wherein the improvement allows the heat rejected in the condenser to be recovered and utilized to actuate a centrifugal gas expander mounted on a common drive shaft of the centrifugal gas compressor, the improvement which comprises:
   a hermetically sealed housing which encloses a centrifugal gas compressor-expander assembly mounted on a common drive shaft, and driven by a common electric motor;
   a refrigeration cycle closed circuit, and a power cycle closed circuit with a heat exchanger adapted to exchange heat between a refrigeration refrigerant fluid and a power fluid;
   an evaporator adapted to effect heat transfer between the refrigeration refrigerant fluid and a secondary fluid;
   means for directing relatively low pressure, relatively warm refrigerant fluid flowing from said evaporator into a centrifugal compressor compartment to compress the refrigeration refrigerant fluid upon rotation of the compressor;
   an expansion valve;
   means for directing the relatively high pressure, relatively cold refrigerant fluid flowing from said heat exchanger through said expansion valve simultaneously substantially reduce the pressure and temperature of said refrigeration refrigerant fluid;
   means for directing the relatively high pressure, relatively hot vapor of the power fluid from said heat exchanger through said centrifugal expander simultaneously substantially reduce the vapor pressure and temperature of said power fluid;
   a condenser adapted to effect heat exchange between the expanded vapor of the power (circuit) fluid, and a secondary cooling fluid to cool, and condense said power fluid vapor;
   means for directing the expanded vapor of the power fluid from said expander outlet to said condenser inlet;
   a pump;
   means for directing the relatively low pressure vapor condensate of the power fluid flowing from said condenser through said pump, simultaneously substantially pressurizing the condensate of said power fluid;
   means for directing said pressurized vapor condensate of said power fluid flowing from said pump to said heat exchanger substantially to heat and evaporate said power fluid.

2. The system according to claim 1 wherein said hermetic sealed housing forms three separated compartments which enclose said compressor, expander, and electric motor drive.

3. The system according to claim 1 further including flow control valves to effect flow rates of refrigerant and the power fluid in the refrigeration and power circuits.

4. A direct expansion refrigeration/heat pump system comprising:
   a three compartment hermetically sealed housing enclosing a common drive shaft having a centrifugal gas compressor connected to a closed refrigeration circuit, a centrifugal gas expander connected in a closed power circuit, and an electric motor assembly mounted on the said common drive shaft;
   a power circuit working fluid;
   a flow control valve mounted in said hermetic sealed enclosure at the discharge side of the expander;
   means for operating said flow control valve to correspond to adjustable levels of working pressure and temperature;
   a condenser;
   a pump;
   means for directing the power fluid flowing from said condenser to said pump to substantially pressurize said power fluid;
   a heat exchanger;
   means for directing the pressurized power fluid flowing from said pump to said heat exchanger to exchange heat with the relatively hot refrigerant fluid of the refrigeration circuit and to substantially heat and evaporate said power fluid;
   means for directing the evaporated power fluid flowing from said heat exchanger to expand through said centrifugal expander;
   means for directing the expanded vapor of the power fluid from the outlet of said centrifugal expander to said condenser;
   a refrigeration circuit refrigerant fluid;
   a flow control valve mounted in said hermetic sealed enclosure at the inlet side of the compressor;
   means for operating said flow control valve to correspond to adjustable levels of working pressure and temperature;
   means for directing the compressed refrigeration refrigerant fluid flowing from the centrifugal compressor discharge to said heat exchanger to substantially cool and condense said refrigerant fluid;
an expansion valve;
means for directing said refrigeration refrigerant fluid flowing from said heat exchanger through said expansion valve, to substantially reduce the pressure, and temperature of the refrigeration refrigerant fluid;
an evaporator to effect heat transfer between the relatively low pressure, relatively low temperature refrigerant fluid flowing from said expansion valve and a secondary fluid to heat and evaporate said refrigerant fluid and to cool said secondary fluid;
means for directing the vapor of said refrigerant fluid from said evaporator outlet to said compressor inlet.

5. A direct expansion type refrigeration/heat pumping process having a refrigeration circuit and power circuit completely separated, but thermally coupled through a common heat exchanger comprising:
continuously receiving relatively low pressure refrigerant fluid of the refrigeration circuit from an evaporator through a flow control valve into a hermetically sealed compressor and thereby substantially pressurizing said refrigerant fluid.
directing the pressurized refrigerant fluid from the gas compressor discharge through a heat exchanger and thereby cooling and condensing said refrigerant;
directing the said cooled refrigerant fluid flowing from the heat exchanger through an expansion valve and thereby substantially reducing the pressure, and temperature of the refrigeration refrigerant fluid;
directing the relatively low pressure, relatively low temperature refrigeration refrigerant fluid flowing from said expansion valve through an evaporator and thereby heating and evaporating said refrigerant fluid and simultaneously cooling a relatively warm secondary fluid;
continuously receiving relatively high pressure, relatively high temperature power fluid flowing from said heat exchanger into the inlet of a hermetically sealed enclosure of a centrifugal gas expander and thereby expanding the power fluid;
directing the expanded relatively low pressure, relatively low temperature vapor of the power fluid flowing from the gas expander discharge through a flow control valve into a condenser and thereby cool and condense the vapor of the power fluid;
directing the vapor condensate of the power fluid flowing from the condenser through a pump and thereby substantially pressurizing the power fluid;
directing the relatively high pressure power fluid flowing from the pump through (the) said heat exchanger and thereby substantially heating and evaporating said power fluid.

6. The direct expansion refrigeration/heat pumping processing according to claim 5 characterized by the steps of admitting relatively low pressure, relatively low temperature first refrigerant gas flowing from an evaporator into a compressor compartment, and discharging a relatively low pressure, relatively low temperature second refrigerant gas flowing from the gas expander into a condenser, and further characterized by partly actuating the compressor by a power expander installed on a common shaft disposed in a hermetically sealed housing assembly and controlled by means of temperature and pressure sensing and control devices.

7. The direct expansion refrigeration/heat pumping processing according to claim 5 further characterized by the step of exchanging thermal energy between the refrigeration refrigerant fluid and the power fluid, and the step of regulating the flow rate of the power fluid flowing from a pump into a heat exchanger to correspond to the desired working pressure and temperature levels of the refrigerant fluid of the refrigeration circuit flowing from the compressor into said heat exchanger.

* * * * *